J. DOWSON AND T. YAMADA.
CAN STAMPING MACHINE.
APPLICATION FILED JULY 15, 1918.

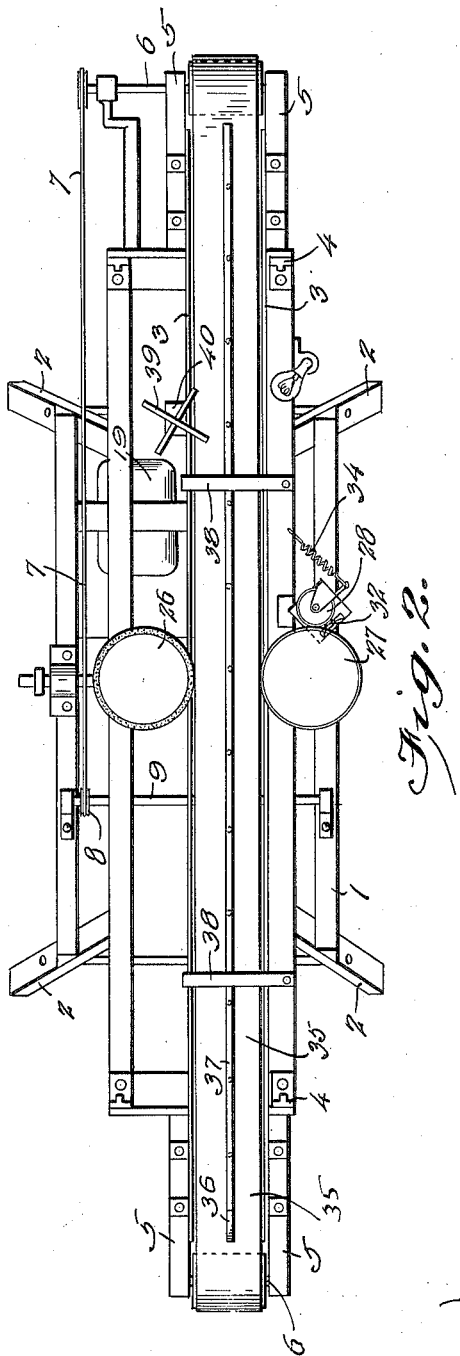

1,303,042.

Patented May 6, 1919.
3 SHEETS—SHEET 3.

UNITED STATES PATENT OFFICE.

JOSEPH DOWSON AND TAKEO YAMADA, OF HONOLULU, TERRITORY OF HAWAII.

CAN-STAMPING MACHINE.

1,303,042.          Specification of Letters Patent.          Patented May 6, 1919.

Application filed July 15, 1918. Serial No. 244,961.

*To all whom it may concern:*

Be it known that we, JOSEPH DOWSON and TAKEO YAMADA, citizens of the United States, residing at Honolulu, Territory of Hawaii, have invented a new and useful Can-Stamping Machine, of which the following is a specification.

The object of our invention is to provide an improved can stamping machine of comparatively simple construction and capable of rapid operation.

In the accompanying drawings illustrating our invention:

Fig. 2 is a top plan;

Fig. 3 is a horizontal section on line 3—3 of Fig. 1;

Like numerals designate like parts throughout the several views.

Figure 1:
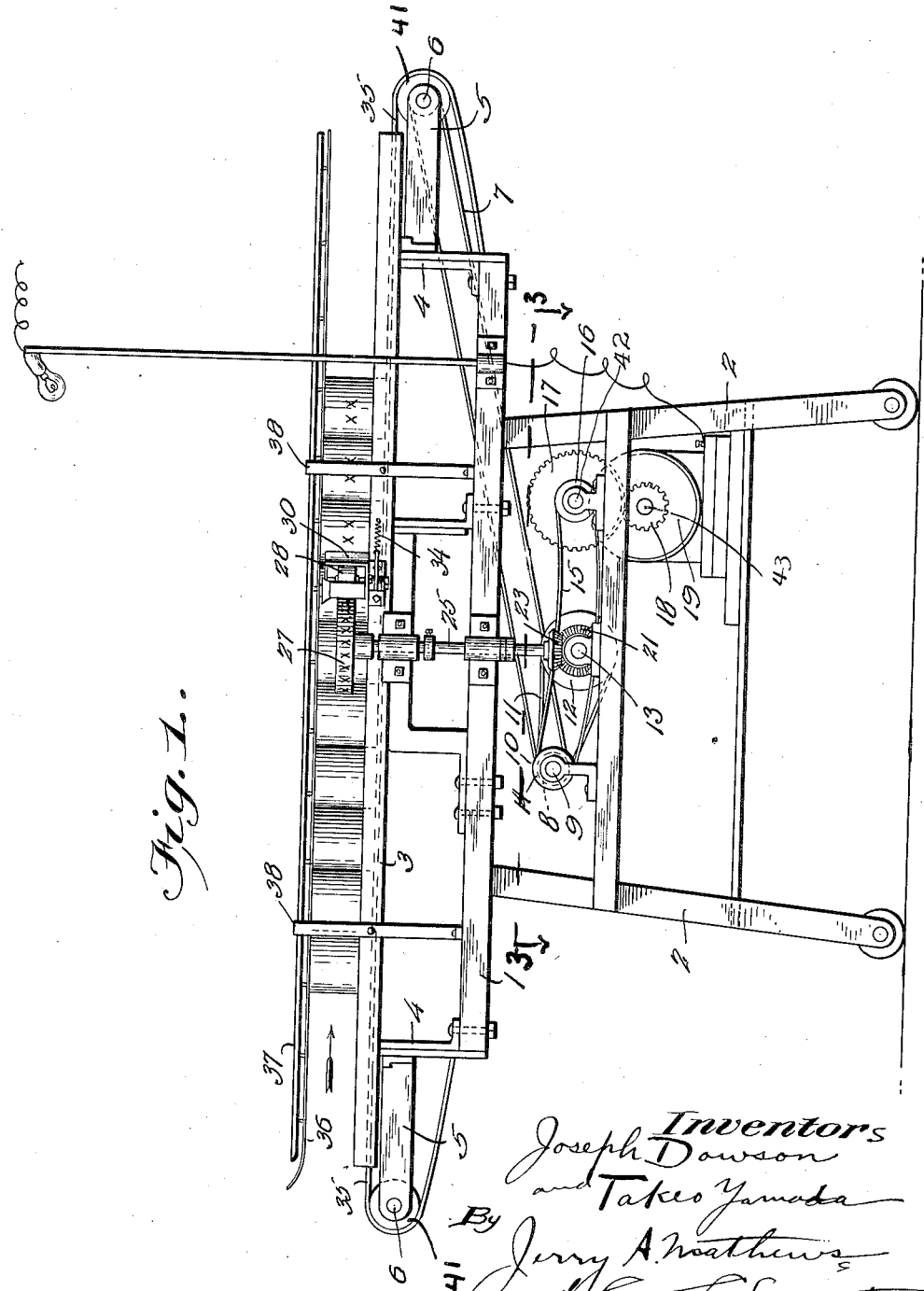
Figure 1 is a side elevation of the machine.

Referring to the accompanying drawings, we provide a suitable frame 1 mounted on supports 2 and an upper frame 3 mounted on uprights 4. We provide horizontal extensions 5, supporting pulleys 41 on shaft 6. An endless belt 35 is mounted on pulleys 41. Mounted on shaft 9 and the extended shaft 6, as shown in Fig. 2, we provide pulleys 8. As shown in Fig. 3 we also provide on shaft 9 a pulley 14, carrying belt 15 which runs over a pulley 16 mounted on the shaft 42, which shaft also carries gear 17. Gear 17, as shown in Fig. 1 is in mesh with gear 18, which in turn is mounted on motor shaft 43, driven by the motor 19.

Shaft 9 carries a pulley 10 over which runs an endless cable 11 which also runs over the pulley 12, which latter pulley is mounted on shaft 13 as shown in Fig. 3.

Suitably mounted on shaft 13 is a bevel gear 20 which meshes with gear 22 on shaft 24, and a similar bevel gear 21 which meshes with gear 23 on shaft 25. Mounted on the upper end of the upright shaft 24 we provide a padded roller 26; and on the upper end of upright shaft 25 we provide a stamping roller 27 which carries the dies for marking the cans.

Figure 4:
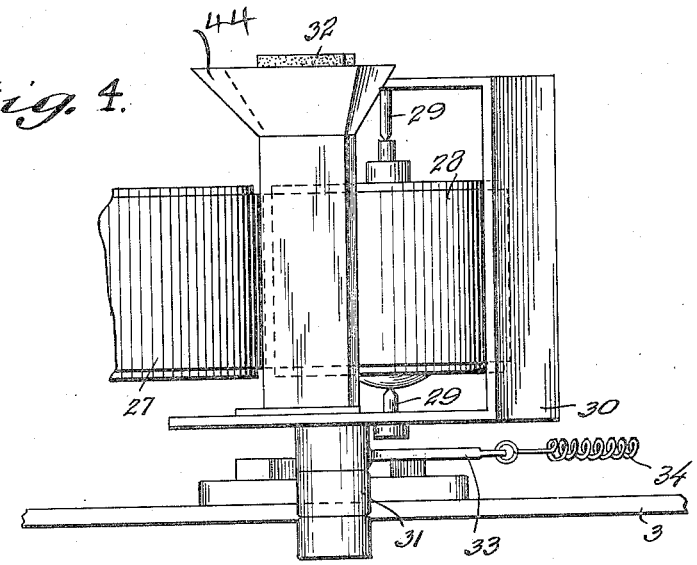
Fig. 4 is a side elevation of the inking mechanism.
Figure 5:
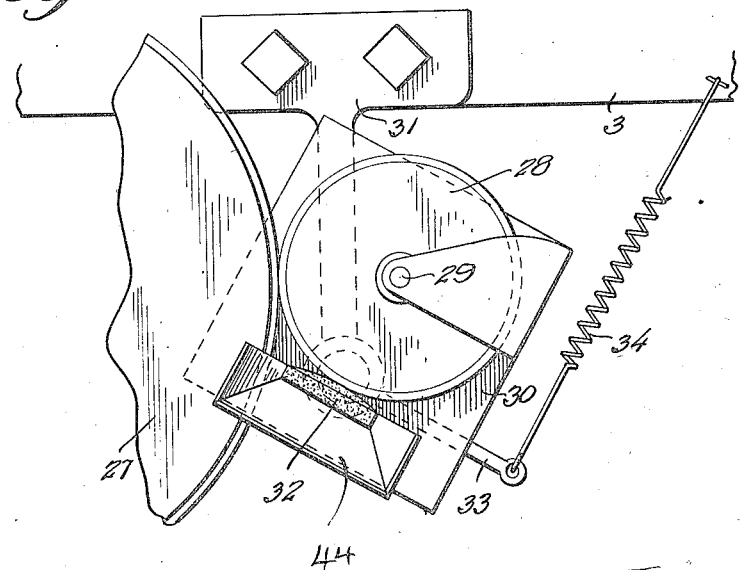
Fig. 5 is a top plan of same.

Roller 27 is inked by the automatic inking mechanism illustrated in Figs. 4 and 5. This mechanism consists of an inking roller 28 supported on pivots 29 which are mounted in a suitable frame 30. We further provide a suitable inking wick or pad 32 which is disposed in contact with the face of roller 28, and which is supplied with ink from a suitable fountain 44. We provide a suitable bracket 31 mounted on frame 3, on the outer end of which bracket is pivotally mounted an extended arm 33, the outer end of which is connected by spring 34 with frame 3. Spring 34 is a compression spring and tends to keep the roller 28 firmly pressed against roller 27, in consequence of pressure exerted by arm 33 on frame 30, in which frame roller 28 is mounted.

Roller 26 is a removable roller, thereby permitting the substitution of padded rollers of different sizes as required for different sized cans which are put through the apparatus.

As a means for guiding and steadying the cans as they pass through the machine on the endless belt 35, as indicated in Fig. 1, we provide a suitable spring guide 36 mounted on member 37, which in turn is supported by the braces 38, suitably secured to frames 1 and 3.

As shown in Fig. 2, we provide a suitable counter, preferably consisting of the turnstile 39 rotatably mounted on suitable support 40 in such position as to cause the turnstile to be rotated by the cans as they move along the endless belt.

In operation the cans are fed successively into the end of the machine, as indicated by the arrows in Fig. 1, the cans being held against any unsteadiness of movement by the spring guides 36 and passing between the rollers 26 and 27 at which point they are stamped by the roller 27 which is constantly inked by the automatic inking mechanism described above. These rollers revolve in a direction to move the cans forward at the same time that ink is supplied by the stamping roller 27. The width of the rollers 26 and 27 is much less than the height of the can and the rollers are positioned to engage the cans near their central portion, which position has been found to make the machine to the best advantage. The cans enter the machine in an upright position. The endless belt 35 which carries the cans is perfectly smooth as it is not necessary that the cans shall be either touching each other or be an exact distance apart. The stamping roller 27 is a removable roller, thereby permitting of the convenient substitution of a different stamping roller for marking a different grade of can.

The machine may be operated preferably by an electric motor as shown or in any other suitable manner. Cans of different sizes up to No. 10 may be marked with the machine by substituting a smaller or larger padded roller 26, as the size of the cans requires.

What we claim is:

1. In a machine of the class described, the combination of an endless can conveying belt, means for operating same, a spring guide spaced above the conveyer belt and extending substantially its entire length in position to engage the tops of all the cans moving along the belt, a padded roller positioned at one side of the can conveying belt to engage one side of the cans, a stamping roller positioned on the other side of the conveyer belt to engage the opposite side of the cans and stamp a character thereon, said rollers being positioned to engage approximately the middle portion of the can to facilitate the operation of the machine, and ink supplying means including an inking roller rotatably engaging the stamping roller, substantially as set forth.

2. In a machine of the class described, the combination of an endless can conveying belt, means for simultaneously operating the conveyer belt and the hereinafter mentioned rollers, guiding means for guiding a line of cans on the belt, oppositely positioned rollers adjacent the path of the cans, one of said rollers being a removable padded roller to permit of the substitution of rollers of different sizes, as required by the size of the can, and the other roller being the stamping roller, said roller being removable to permit of the substitution of rollers bearing different dies, an inking roller rotatably engaging the stamping roller, inking means, substantially as described, and means for rotating the padded roller and the stamping roller in the direction in which the can conveying belt is traveling.

JOSEPH DOWSON.
TAKEO YAMADA.

Witness:
 PHILIP A. HODGES.